Sept. 25, 1934.  H. F. JERMAIN  1,974,921
SOUND ATTACHMENT FOR MOVING PICTURE PROJECTORS
Filed July 22, 1929  2 Sheets-Sheet 1
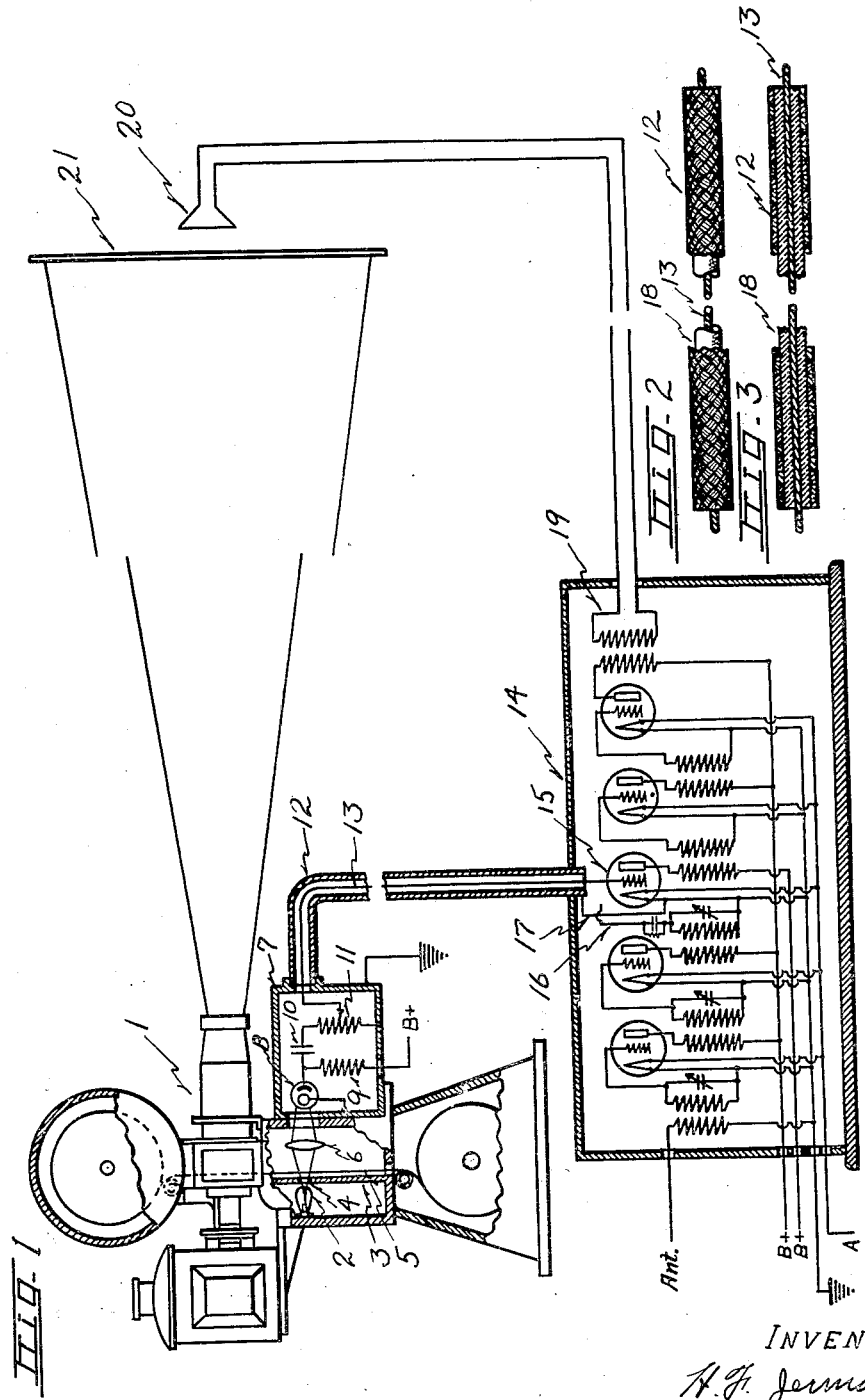
WITNESS
F. F. DeBoalt
INVENTOR
H. F. Jermain
BY
Denison & Thompson
ATTORNEYS.

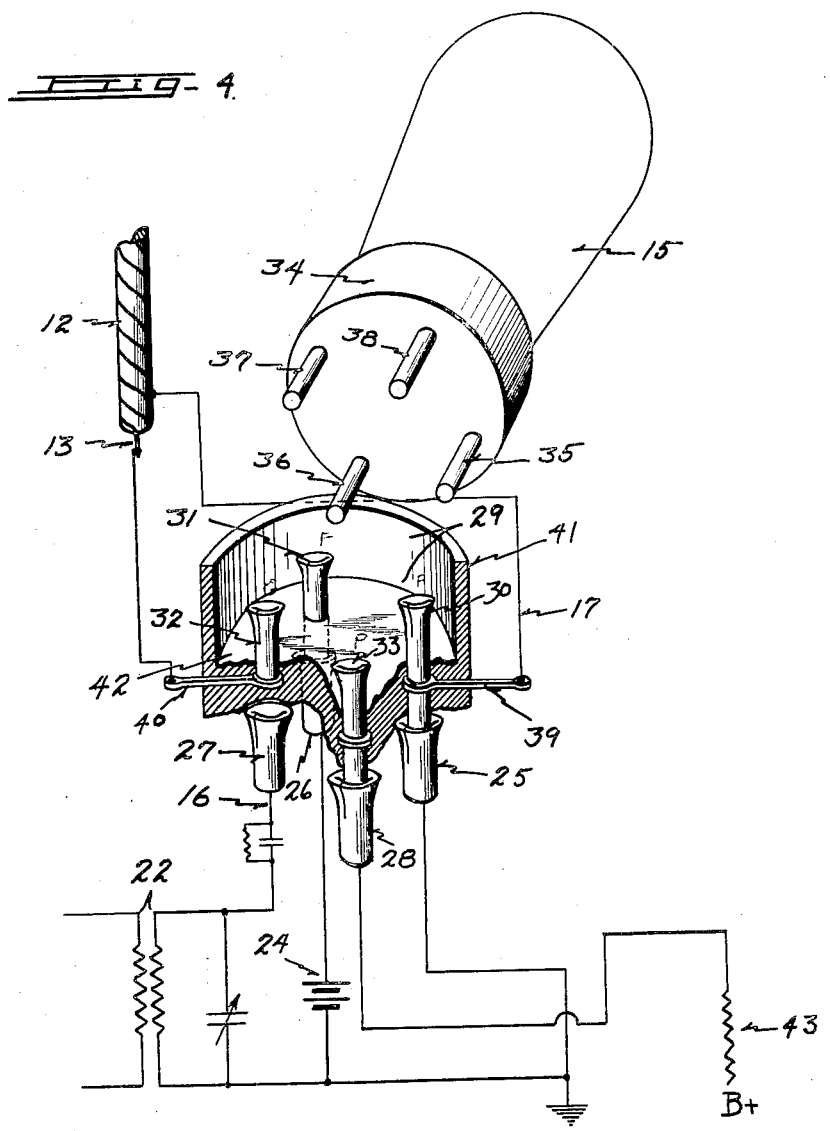

Patented Sept. 25, 1934

1,974,921

UNITED STATES PATENT OFFICE 1,974,921

SOUND ATTACHMENT FOR MOVING PICTURE PROJECTORS

Herbert F. Jermain, New York, N. Y., assignor, by mesne assignments, to Movietonews, Inc., New York, N. Y., a corporation of New York Application July 22, 1929, Serial No. 380,143

3 Claims. (Cl. 179—100.3)

This invention relates to a new and useful sound attachment for moving picture projectors.

Sound attachments for use at present require one or more stages of amplification in close proximity for successful operation. A distance greater than approximately six inches from a photoelectric cell to an amplifier formerly made the system inoperative.

It is an object of my invention to provide a sound attachment for a motion picture projector that does not require a thermionic tube amplifier in close proximity. The new apparatus is so designed as to operate in conjunction with an amplifier at a distance of approximately 50 feet. By utilizing the audio frequency amplifier system of a commercial radio set the moving picture projector with sound attachment becomes a reality for use in homes, schools and clubs where the cost of regular theatre equipment would be prohibitive.

Further objects and advantages will be apparent with reference to the accompanying drawings, in which:—

Figure 1 is a schematic view of the entire operative system.

Figure 2 shows construction details of the connecting cable between sound attachment and amplifier.

Figure 3 is a longitudinal section of the cable shown in Figure 2.

Fig. 4 illustrates the use of a special vacuum tube adaptor in the radio receiver.

A moving picture projector 1 of a conventional type adapted for sound reproduction is shown. The sound apparatus only will be discussed in detail as it relates directly to this invention. A sound lamp 2 gives a source of light which is projected through wall 3 at slit 4. Film 5 passing slit 4 sets up light pulsations due to the sound record photographed thereon which in turn are collected by lens 6 and directed on photo-electric cell 8 in the sound attachment.

Metal case 7 encloses the sound attachment comprising photo-electric cell 8, coupling resistance 9, coupling capacity 10 and volume control 11. Values of the resistances 9 and 11 and capacity 10 are chosen so as to conform with the characteristics of the photo-electric cell 8. Connection from the sound attachment to the amplifier of a radio set 14 is made by means of a flexible cable 13 well insulated and shielded. Details of this cable are shown in Figures 2 and 3.

Conductor 13 is of a flexible braided wire type molded in good rubber insulation 18. A braided copper shield 12 or some other suitable shielding covers the cable throughout its entire length. By using a special vacuum tube adaptor entrance is made to the radio set amplifier without breaking any standard connections. The special adaptor is more specifically illustrated in Figure 4. Adaptor 29 comprises a cylindrical portion 41 of insulating material and a base 42 preferably of the same material as the cylindrical portion. The base 42 is provided with a plurality of receptacles, in this instance four being shown; however, any number may be used depending upon the particular type of tube, for receiving the prongs of a radio tube.

The receptacles are indicated by the numbers 30, 31, 32 and 33 which respectively, are adapted to receive the prongs 35, 36, 37 and 38 of vacuum tube 15 which, in this instance, is the detector tube.

The prongs are, in the order named, connected to the filament, grid and plate terminals of the tube. All receptacles of the adaptor, with the exception of 32, have projecting prongs extending through the base 42. These prongs are adapted to contact with the receptacles 25, 26 and 28 of a standard vacuum tube socket. These last-named receptacles are, in the order named, connected to the filament, filament and plate terminals of the radio receiving circuit. Only the grid receptacle 32 does not contact with the socket grid receptacle 27 for reasons as will be explained later.

In order to retain simplicity, the receptacles 25, 26, 27 and 28 are shown to indicate the tube socket of the radio receiver. Connections to these receptacles are indicated diagrammatically. The high voltage side of the secondary winding of transformer 22 is connected by means of a wire 16 to the grid receptacle 27. Receptacle 26 connects to one terminal of the so-called A-battery 24, which has its other terminal grounded, as shown.

Receptacle 25 is connected to ground. Plate receptacle 28 is connected in circuit with the primary winding 43 of the first transformer of the audio amplifying system. The plate receptacle is excited with a source of positive potential, not shown but indicated as "B-plus" on the drawing.

Adaptor 29 is further provided with two lugs 39 and 40 which contact with receptacles 30 and 32 respectively. These lugs provide connecting means from the output of the photo-electric cell circuit through the shielded cable having an internal conductor 13 and a metallic outer shield 12. Conductor 13 may be secured to lug 40 while the shield 12 may be connected to lug 39. The adaptor, therefore, provides means for gaining entrance to the grid circuit of a detector tube whereby the radio frequency amplifier ahead of the detector is electrically disconnected and the audio frequency amplifier is made available for other purposes than the amplification of electrical impulses received through the radio frequency channels.

For the purpose of illustration, the adaptor has been shown in connection with the detector tube of a radio receiver. It is to be understood that this does not restrict the use of the adaptor in any way, as the same may be used effectively in connection with other tubes of the radio receiver. Inserting the adaptor in the detector tube socket connections from cable 13 to the grid of the tube 15 are made direct and at the same time the standard radio frequency grid circuit of the radio set is disconnected at 16.

Since the shield 12 is grounded to the case of the projector it can safely be connected to the grounded filament terminal of tube 15 by means of connecting wire 17. Entrance is thus made to the audio amplifier of the radio set and at the same time any interference from radio frequency pick-up is eliminated. The out-put transformer 19 connects the amplifier to a loud speaker 20 which can be conveniently placed near the projecting screen 21. Should, however, the speaker system be of the built-in type the cable 12 will be of sufficient length to allow the radio set to be placed near the screen, thereby still insuring natural reproduction.

Heretofore it was impossible to operate a sound attachment at a distance greater than approximately six inches from its first stage of amplification. Using a photo-electric cell of low impedance and shielding the grid lead to the amplifier, operation of the amplifier at a distance of approximately fifty feet was made possible.

The shield about the connecting cable also prevents any electro-magnetic pick-up. Capacity from the fine stranded cable to ground is small and therefore does not interfere with the frequency characteristic of the amplifier input.

Having a volume control at the projector has the advantage of requiring only one operator for the entire system.

While I have disclosed a specific sound attachment for a moving picture system, it is to be understood that the same was used merely to exemplify my invention, and that many changes and modifications can be made without departing from the spirit and scope of the appended claims.

I claim:

1. In a combined moving picture and sound reproducing system, a radio receiver having a detector and an audio frequency amplifier and a radio frequency circuit connected to the input of said detector, a photo-electric cell device including a gain control remote from said radio receiver, and means including an insulated conductor metallically shielded throughout its entire length for connecting said photo-electric cell device through said gain control to the input circuit of said detector and thereupon rendering inoperative the radio frequency circuit to the input of said detector.

2. The combination with a moving picture projector having a sound attachment including a photo-electric cell and means for projecting light variations upon said cell corresponding to sound wave variations recorded upon a film, of a gain control connected across said cell and closely adjacent thereto, a radio receiver positioned relatively remote from said cell having a detector and an audio frequency amplifier, and a radio frequency circuit normally connected to the input of said detector, and means including an electrical connection shielded throughout its entire length from said gain control to the input circuit of said detector and for rendering inoperative the radio frequency connection to said detector.

3. The combination with a moving picture projector having a sound attachment including a photo-electric cell and means for projecting light variations upon said cell corresponding to sound wave variations recorded upon a film, a gain control capacitively coupled across said cell and closely adjacent thereto, a radio receiver positioned relatively remote from said cell having a detector and an audio frequency amplifier, and a radio frequency circuit normally connected to the input of said detector, and means including an electrical connection shielded throughout its entire length from said gain control to the input circuit of said detector and for rendering inoperative the radio frequency connection to said detector.

HERBERT F. JERMAIN.